United States Patent [19]
Jache

[11] 3,763,416
[45] Oct. 2, 1973

[54] VOLTAGE REGULATOR SYSTEM FOR SECONDARY BATTERIES

[75] Inventor: Otto Jache, Budingen, Germany

[73] Assignee: Accumulatorenfabrik Sonnenschein G.m.b.H., Budingen, Germany

[22] Filed: May 24, 1972

[21] Appl. No.: 256,521

[30] Foreign Application Priority Data
June 8, 1971 Germany.................. P 21 28 510.9

[52] U.S. Cl.................. 320/35, 320/2, 136/171, 180/68.5
[51] Int. Cl. .................................. H01m 45/04
[58] Field of Search........................ 320/35, 36, 2; 322/33; 136/181, 171, 172, 166, 173; 180/68.5

[56] References Cited
UNITED STATES PATENTS

| | | | |
|---|---|---|---|
| 2,206,306 | 7/1940 | Sager.................. | 136/171 X |
| 3,274,477 | 9/1966 | Boyes................... | 320/35 |
| 2,498,814 | 2/1950 | Little et al. ........... | 320/35 |
| 3,609,505 | 9/1971 | Harland et al. ........ | 320/35 |

Primary Examiner—J. D. Miller
Assistant Examiner—Robert J. Hickey
Attorney—Flynn & Frishauf

[57] ABSTRACT

To permit charging of secondary batteries by electrical power at a voltage which is just below the gassing voltage of the battery, a temperature sensing device is placed on the holder for the battery, spring-pressed against the battery so that the actual battery temperature will be sensed. The sensed temperature then is utilized to control the voltage regulator to vary the charge voltage in accordance with actual battery temperature to provide for most rapid and safe charging under all battery operating conditions.

8 Claims, 3 Drawing Figures

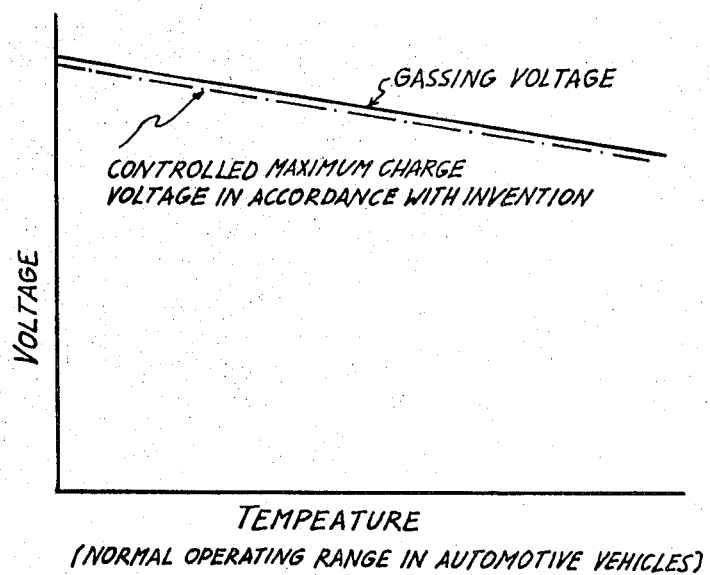

VOLTAGE REGULATOR SYSTEM FOR SECONDARY BATTERIES

The present invention relates to a voltage regulator system in the charging circuits of secondary batteries, and more particularly to voltage regulator systems for secondary batteries used in automotive vehicles and the like. In such systems, voltage regulators control the voltage being applied to the battery to charge the battery as the vehicle engine operates. The charge voltage should be limited to a predetermined maximum value. This maximum value is highly temperature dependent.

Charging arrangement, particularly for automotive vehicles, have voltage regulators in which the electrical supply or charging voltage is held below a predetermined voltage of the secondary battery, in order to insure long battery life. Voltage regulators have been proposed in which temperature sensing elements are provided to adjust the supply voltage in dependence on temperature of the electrolyte of the battery. Such known regulators utilize a thermistor inserted into a cell of the battery so as to be sensitive to the temperature of the electrolyte within the battery cell. To install a temperature sensing element within a battery, the latter, however, must be provided with a specific mounting means. When a battery is replaced by a new one, the temperature sensor must be detached and installed in the new one.

Batteries should give as little trouble in installation and operation as possible. Lead-acid type batteries should be charged preferably in such a manner that the electrical power for re-charging is applied at voltages which are just below the gassing voltage, so that whenever power has been taken from the battery is re-applied to the battery in as short a period of time as possible, without decomposition of the electrolyte, and thus loss of water by electrolytic decomposition. The gassing voltage of lead-type batteries exhibits a substantial negative temperature coefficient, that is, the gassing voltage drops as the temperature increases.

It is an object of the present invention to provide an improved voltage regulator system wherein a battery will be charged fully and safely without insertion of a temperature sensor into the battery.

SUBJECT MATTER OF THE PRESENT INVENITON

Briefly, a temperature sensing element is located to automatically contact a battery in good heat transfer relation when the battery is inserted into the holder. The temperature sensing element is permanently and fixedly connected to the voltage regulator which control battery charge voltage to a level which depends on actual, sensed battery temperature. This charge voltage level is preferably set to be just below the gassing voltage.

In accordance with a preferred embodiment, the temperature sensor is located at the side, or below the holding plate or holding assembly for the battery, and spring-pressed against the battery. The sensor can be combined with a voltage regulator, particularly with an solid state electronic voltage regulator. Thus, when the battery itself is changed or moved, no structural changes or changes of interconnections to the temperature sensing elements themselves have to be made. The output signal of the temperature sensor which is directly representative of actual battery temperature then is utilized as a control value to determine the maximum value of the charge voltage so that the charge voltage, at any temperature, is just below the gassing voltage of the battery itself.

Voltage regulators of a type particularly useful in connection with the present invention are shown in U.S. Pat. No. 3,296,516. In order to introduce a correcting signal from a temperature sensing element into the circuit, a thermistor is connected in circuit with a voltage divider to modify the charge voltage setting of the voltage divider in response to battery temperature such that the rate of change of charge voltage setting of the regulator due to temperature increase will be about the same as the rate of change in gassing voltage of the battery due to such temperature increase.

The invention will be described by way of example with reference to the accompanying drawings, wherein:

FIG. 3 is a graphical illustration of the maximum charge voltage controlled in accordance with the invention and of the gassing voltage versus temperature of a battery.

Figure 1:
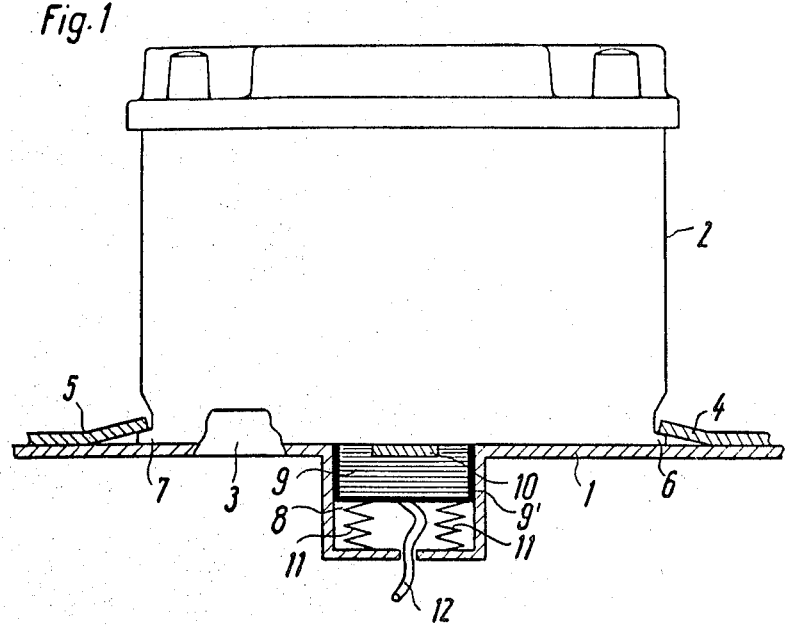
FIG. 1 is a vertical cross-sectional view through a holder for a battery, in which a sensing element coupled to a voltage regulator is located in the bottom, the battery being shown schematically.

A base plate 1 has a battery, schematically shown at 2 placed thereon. Base plate 1 is secured in a usual and customary manner, as desired, in a motor vehicle. It is, preferably, formed with laterial guide strips or plates 3 to hold the battery in place. To secure the battery to the base plate, clamps 4, 5 are provided, to be clamped by screws (not shown) against the bottom plate and engaging small notches formed in the battery, that is, to fit over transverse ridges 6, 7, remaining below the notches of the battery. Various other ways to hold the battery in place can be used, for example hold-down straps passing across the battery from the top, or the like, as desired.

The base plate 1 of the battery holder has an opening 8 formed centrally therein, in which a voltage regulator 9 is located, to control the charge voltage to the battery. Regulator 9 is preferably of the electronic type, as shown in U.S. Pat. No. 3,296,516, and utilizes a printed circuit. A temperature sensing element 10 is provided, which measures the actual temperature of the battery. Sensor 10 is placed on the surface of the voltage regulator which faces the battery. The voltage regulator 9 is held within the opening 8 by means of springs 11, which press the regulator 9 and the temperature sensor 10 secured thereto in the direction of the bottom wall of the battery, to provide a good contact between the temperature sensitive element 10 and the battery itself. The temperature sensitive element 10, preferably, is a thermistor.

As shown in FIG. 3, the output signal of the temperature sensor is utilized as a control signal to control the voltage to charge the battery to a value which is just below the gassing voltage of the battery. In a preferred form, the temperature sensor is insulated against outside temperature disturbances. As shown in FIG. 1, the regulator 9 is covered with a temperature insulating layer 9' throughout its circumference, except on the surface facing the battery itself. It is also possible to insulate the entire opening 8, see FIG. 2, where the opening in the base plate is arranged in form of a cavity which is completely lined on the inside wih temperature insulation material 9''. Thus, the temperature sensor itself is insulated against interfering outside temperature disturbances. Controller 9 is connected over a cable 12 to the usual alternator or other charging element, to be driven by a prime mover.

If the battery 2 is to be replaced, or removed from the holder, no connecting lines need be broken, since there is no actual electrical or fixed mechanical connection between the voltage regulator and the temperature sensor on the one hand, and the battery on the other; the voltage regulator is merely held in place by spring 11, which now will project the entire unit slightly above the base plate 1.

Figure 2:
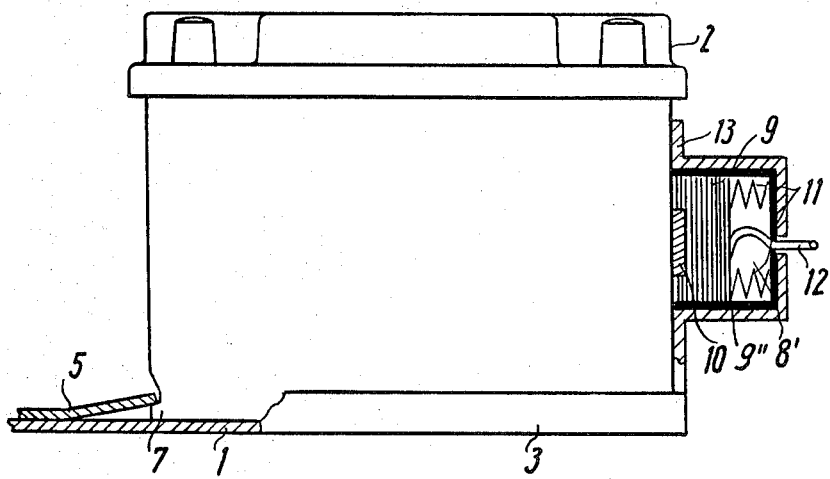
FIG. 2 is a vertical cross-sectional view through a similar arrangement in which the temperature sensing element is located at the side of the battery.

The embodiment of FIG. 2 illustrates a cavity 8' in which the voltage regulator 9 is located. Cavity 8' is located in the side wall 13 of the battery holder, so that the temperature sensor 10 of the voltage regulator is pressed against the side wall of the battery to have thermal conductive contact therewith.

In the embodiment shown, the temperature sensor is formed as one unitary element with the voltage regulator. It is equally possible to locate the voltage regulator at any desired place within the motor vehicle, for example where convenient for servicing, or at or in combination with the motor vehicle alternator, and to place only a temperature sensing element in such a position that the temperature of the battery itself will be sensed, by contact with the bottom or side wall of the battery. Again, the temperature sensing element itself should be pressed against the battery by springs or the like, in order to provide for good heat transfer between the battery and the temperature sensor and to avoid the necessity of connecting or re-connecting additional electrical terminals if the battery is to be moved or changed. In a preferred form, however, the temperature sensor and the voltage regulator are combined as a single unit, the entire unit being made as a replaceable element in case of malfunction of any of the components thereof.

Various changes and modifications may be made within the inventive concept.

I claim:

1. In a voltage regulator system for secondary batteries 2 in which the battery 2 is charged from a source of variable voltage;
a holder means 1, 3, 4, 5, 13 holding the battery in a fixed location including a member 1, 13 located adjacent the battery when the battery is placed against the holder means;
a voltage regulator 9 limiting the charge voltage to a predetermined value;
and temperature sensitive means providing an electrical signal connected to the voltage regulator to affect charge voltage in dependence on battery temperature;
the improvement wherein
said member 1, 13 of the holder means adjacent the battery 2 is formed with a cavity therein, the temperature sensing means 10 being an element mechanically separate from the battery 2 and located in the cavity to contact the outside wall of the battery and to be in heat transfer relation therewith to sense battery temperature.

2. System according to claim 1, wherein
resilient means 11 are provident resiliently biassing the temperature sensor into contact with the battery wall.

3. System according to claim 2, wherein the temperature sensor is located against the bottom wall of the battery.

4. System according to claim 2, wherein the temperature sensor is located against the side wall of the battery.

5. System according to claim 2, wherein the voltage regulator and the temperature sensor form one integral unit, said unit being spring-pressed by said resilient means against the battery.

6. System according to claim 1, wherein
the temperature sensor and voltage regulator form an integral unit located in the cavity and resiliently held therein with the temperature sensor facing the battery when the battery is located in position with respect to the holder means.

7. System according to claim 6, wherein the member is plate-like and formed with a closed cavity, the temperature sensor-voltage regulator unit and the resilient means being located in said cavity;
and thermal insulation means are located at least in part in said cavity to insulate the temperature sensor from outside temperature disturbances.

8. System according to claim 1, further comprising thermal insulating means insulating the temperature sensor against outside temperature disturbances and surrounding the temperature sensor at least in part.

* * * * *

UNITED STATES PATENT OFFICE
CERTIFICATE OF CORRECTION

Patent No. 3,763,416      Dated October 2, 1973

Inventor(s) Otto Jache

It is certified that error appears in the above-identified patent and that said Letters Patent are hereby corrected as shown below:

In the claims:

All reference numerals:

2,2, 1, 3, 4, 5, 13, 1, 13, 9, 1, 13, 2, 10, 2, 11 should have parentheses placed there around, since these are reference numerals.

Signed and sealed this 12th day of February 1974.

(SEAL)
Attest:

EDWARD M. FLETCHER, JR.
Attesting Officer

C. MARSHALL DANN
Commissioner of Patents